Oct. 7, 1952　　　W. L. TENNEY ET AL　　　2,612,748
PULSE JET MOUNT
Filed April 6, 1946　　　　　　　　　　3 Sheets-Sheet 1
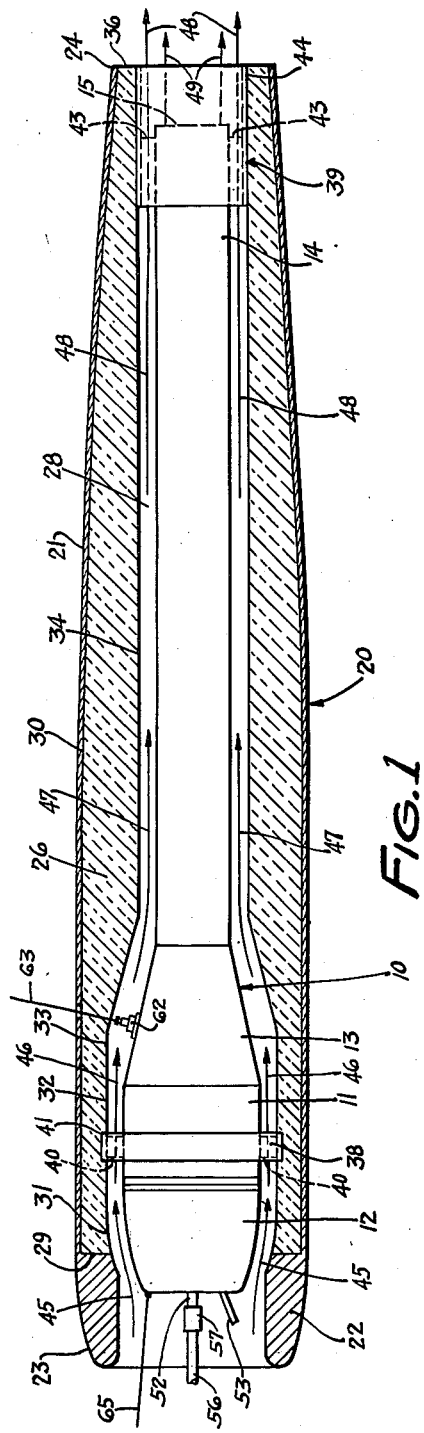
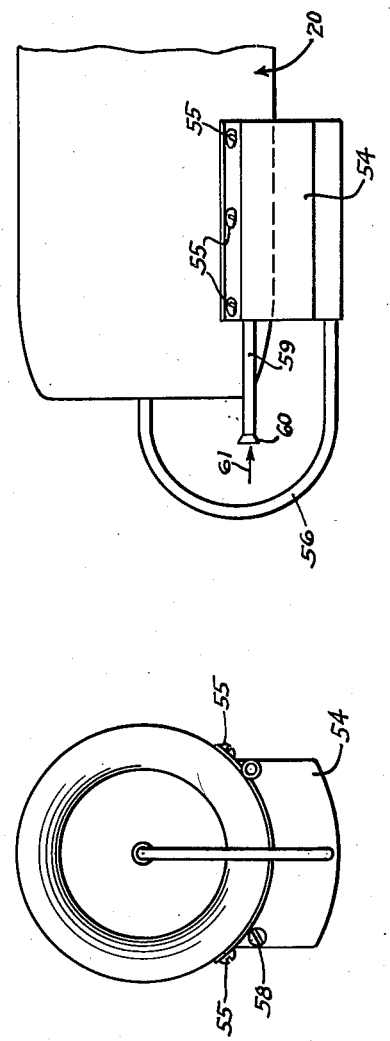
INVENTORS
WILLIAM L. TENNEY
BY CHARLES B. MARKS
Paul, Paul & Moore
ATTORNEYS Oct. 7, 1952 — W. L. TENNEY ET AL — 2,612,748
PULSE JET MOUNT
Filed April 6, 1946 — 3 Sheets-Sheet 2

INVENTORS
WILLIAM L. TENNEY
CHARLES B. MARKS
BY Paul, Paul & Moore
ATTORNEYS

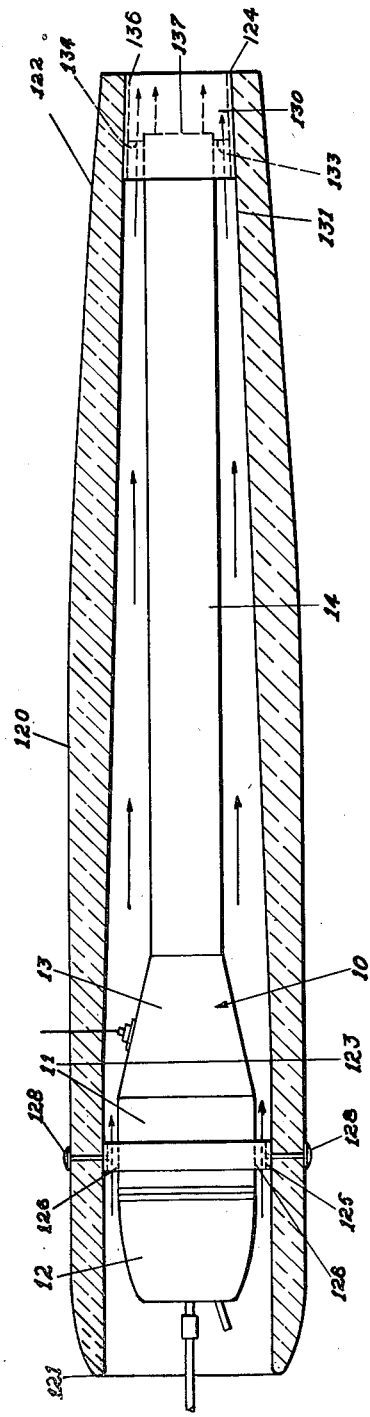

Patented Oct. 7, 1952

2,612,748

UNITED STATES PATENT OFFICE 2,612,748

PULSE JET MOUNT

William L. Tenney, Crystal Bay, Minn., and Charles B. Marks, Las Vegas, Nev.; said Marks assignor to said Tenney Application April 6, 1946, Serial No. 660,118

5 Claims. (Cl. 60—35.6)

This invention relates to jet propulsion devices and more particularly to jet propulsion devices, mountings and shrouds therefor. In jet propulsion devices the combustion of fuel in the combustion chamber of the engine produces an exceedingly high temperature which heats the combustion chamber and some or all of the exhaust pipe or pipes leading therefrom. As a result a very considerable amount of heat is radiated from the combustion chamber. Where the jet propulsion device is mounted in the open, the heat that is rejected from the surface of the combustion chamber and exhaust pipe or pipes does no harm other than the loss in efficiency that is occasioned thereby, but in many applications it is desirable to mount the jet propulsion device on or within a portion of the vehicle or unit being propelled, and the rejected heat thereby causes a heating hazard to the vehicle or propelled device unless suitable provision is made for dissipating the heat, both while the propelled device is in motion and also when the device has been stopped after a hard and hot run.

It is an object of the present invention to provide a jet propulsion unit, together with a mounting and shroud therefor, capable of providing for safe housing of the unit on a propelled vehicle or device without heat hazard to the propelled device or to the operator of the device. It is also an object of the invention to provide a more efficient jet propelling unit wherein the heat ordinarily rejected and dissipated from the combustion chamber and exhaust pipe or pipes is reclaimed at least in part and converted into useful mechanical jet propulsion energy. It is a further object of the invention to provide an improved jet propulsion device particularly adapted for miniature or model vehicles, such as model airplanes, racing cars, boats and the like, and suitable for mounting in vehicles constructed of materials which are inflammable or capable of being deteriorated by heat. It is a further object of the invention to provide as new articles of manufacture a combined jet propulsion device shroud and mounting; an improved jet propulsion device shroud and mounting apparatus for miniature airplane sub-assemblies, including a portion of the miniature airplane, such as the fuselage.

Other and further objects of the invention are those inherent in the apparatus herein illustrated, described and claimed.

The invention is illustrated with reference to the drawings in which:

Figure 1 is a side elevational view, partly in section, showing a jet propulsion device, together with the mounting and shroud therefor;

Figure 2 is a front elevational view of the apparatus shown in Figure 1;

Figure 3 is a fragmentary side elevational view of the front portion of the apparatus shown in Figure 1, including various auxiliaries;

Figures 4, 5 and 6 are side elevational views, partly in section, illustrating, respectively, three additional forms of the invention.

Throughout the drawings, corresponding numerals refer to the same parts.

Figure 4:
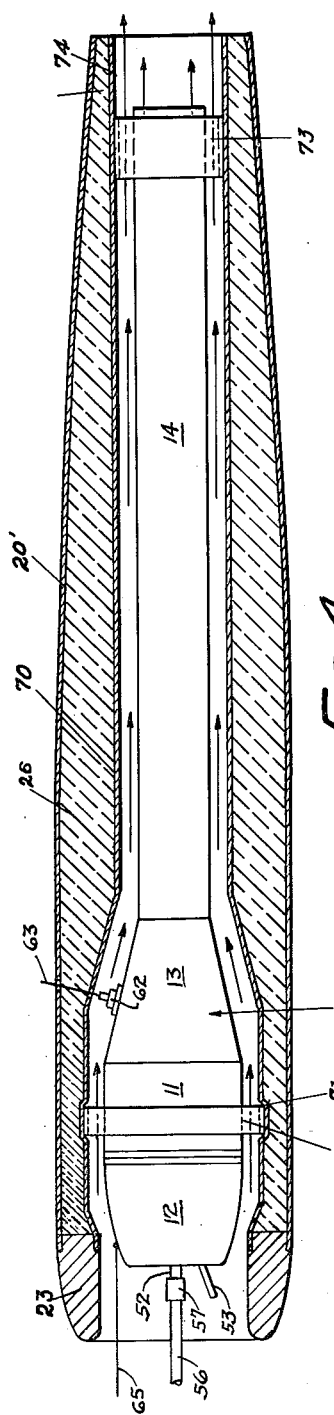

Referring to the drawings, in Figures 1, 2 and 3 there is provided a jet propulsion device generally designated 10 having a combustion chamber 11 which is provided at its forward end with a forwardly tapered housing 12 containing an inlet passage through which the inlet air and fuel mixture is adapted to be introduced into the combustion chamber. The combustion chamber has a rearwardly tapered portion 13 which terminates in an exhaust tube 14 of uniform cross sectional area which extends to and terminates at the rear edge 15. The construction of the jet propulsion device may be of any desired type such as that described in our copending application Ser. No. 649,882, filed February 25, 1946, entitled Pulse Jet Engine, to which reference is here made. The construction of the jet unit 10, per se, forms no part of the present invention.

In operation the jet propulsion device 10 is intensely heated, particularly the rear portion of the jet combustion chamber 11, the tapered section 13 and all or at least that part of the exhaust tube 14 adjacent the combustion chamber, and heat therefrom is ordinarily rejected to the surrounding air when the device is openly mounted. The forward end of the combustion chamber 11, where it is joined to the inlet portion 12, is generally cool since the combustion air flowing through the inlet and the evaporation of the liquid fuel in the inlet tends to maintain the temperature of these parts well below red heat. In accordance with the present invention the jet propulsion unit 10 is mounted within a mounting and shroud unit generally designated 20, having an outer shell 21 that is attached to a forward nose section 22 so as to form an integral unit which is generally tapered at its forward end 23 and its rearward end 24. The outer shape of unit 20 may be the shape of an airplane fuselage, model car body, wing section, or the like, and may be aerodynamically streamlined. The materials from which the shell 21 and nose piece 22 are constructed may be of wood, plastic, metal, fiber, doped cloth, or any other suitable material capable of withstanding the stresses involved.

During use these portions of the apparatus are maintained at such a low temperature that no problem of deterioration due to heating is involved. The low temperature of operation of the outer shell 21—22 is accomplished by providing an insulating filler 26 which forms an enclosing shell around the jet propulsion device 10 but spaced therefrom by an air space 28. The insulating filling is of the rigid type such as molding asbestos, and abuts against the rear surface of the nose piece as shown at 29 and completely fills the outer shell 21 and may be bonded thereto by any suitable cement along the surface 30. The insulation is shaped with a curve at 31 so as generally to conform to the curve of the forward section 12 of the jet propulsion unit, and thence is of substantially uniform diameter at 32 opposite the portion 11 of the combustion zone. A somewhat increased space is provided at 33 in view of the intense heat radiation at this portion of the combustion chamber, and thence continues along the uniform diameter 34 to the rear portion of the unit and ends at the rear edge 36.

The jet propulsion unit is supported in spaced relationship to the interior aperture of the insulating filling 26 by means of a forward mounting ring 38 and rear mounting ring 39. The forward mounting ring is attached to the combustion zone by a plurality of longitudinal fins 40 between the combustion zone 11 and the ring. Two or more fins may be used so as to maintain the spacing of the propulsion unit 10 at the forward end. Being oriented lengthwise of the unit, the fins do not appreciably retard flow of cooling air through space 28. The ring 38 is preferably embedded into the insulating material 26, as indicated at 41, so as to prevent longitudinal displacement of the jet device 10 with reference to the insulation filled shell 20. At the rear end of the jet propulsion unit the mounting ring 39 extends to the rear edge 36 and is likewise maintained in spaced relationship to the exhaust tube 14 by two or more longitudinal spacing fins 43. The portion 44 of the mounting ring overhangs the rear edge 15 of the tube 14 and serves to protect the somewhat fragile insulation filling 26 from the abrasive action of the exhaust gases as they issue from the propulsion device. The rear mounting ring 39 which supports the insulation filled shell 20 is not permanently secured to the shell structure as is apparent from Figure 1. The exhaust tube 14 which is heated by the high temperature exhaust gases passing therethrough expands materially during the operation of the jet propulsion device 10. This provision for a slidable relation between the rear ring 39 and the insulated shell 20 supported thereon permits longitudinal movement of the exhaust tube 14 with respect to the insulated shell 20.

It will thus be seen that there is a clear channel as indicated by the arrows 45, 46, 47 and 48 permitting the flow of air around the body of the jet propulsion device 10 when the device is in use. The exhaust gases issuing from the rear edge 15 of the exhaust tube, as indicated by the arrows 49, serve to provide an ejector effect which maintains the flow of cooling air around the jet propulsion device 10 even while it is stationary. The flow around the jet propulsion device, as indicated by arrows 45—48, is much intensified when the unit is moving through the air.

The jet propulsion device is provided with a fuel inlet tube 52 and a starting air inlet tube 53, as described in our aforementioned application Ser. No. 649,882. As indicated in Figures 2 and 3 a fuel tank 54 may be mounted outside the housing 20 by a plurality of screws indicated at 55. The fuel tank is provided with a fuel outlet pipe 56 which is attached to the fuel inlet tube 52 by means of a short length of rubber tubing 57 when the device is in operation. The fuel tank is likewise provided with a filler plug which is normally closed by the screw cap 58 and with an air inlet tube 59 that is directed in the direction of motion of the unit and slightly belled out at its forward end, as indicated at 60. When the entire jet propulsion device and housing are moving through the atmosphere an air pressure is developed in tube 59 by air entering, as indicated by arrow 61, and a positive pressure is therefore applied on the surface of the fuel within tank 54, thus enhancing the flow of fluid through line 56 to fuel inlet line 52.

The ignition device 62 of the jet propulsion device is provided with an ignition wire 63 which simply passes out through the insulating filling 26 and the outer shell 21. Where the outer shell 21 or the filling 26 are conductive, an insulating bushing, not illustrated, is provided around the wire 63. For initiating operation of the device, an air pressure line is attached to the starting air inlet tube 53 and a high tension ignition wire attached to wire 63. The other ignition wire may be attached to any metallic portion of the jet inlet device as indicated, for example, by wire 65 which is attached to the air inlet housing 12.

In operation the jet device is started and a large blast of exhaust gases emanates, as indicated by arrow 49, from the rear end 15 of the exhaust tube. The jet effect of these gases pulls additional cooling air around the jet propulsion unit 10 in the space inside the filling 26, as indicated by the arrows 45—48. It has been found in operation that a considerable heating and, apparently, expansion of the cooling air takes place during its passage around the jet propulsion device and that an additional jet propulsion force is developed by the cooling air emanating at arrow 48. An additional thrust of as much as 15–20% has thereby been obtained.

Referring to Figure 4 there is illustrated another form of the invention where the construction is the same as shown in Figure 1 except that a liner 70 is provided on the inner surface of the shell 20' so as to protect the insulation filling 26. The inner surface of the insulation 26 is accordingly prevented from disintegration due to vibration or abrasion caused by the flow of cooling air therethrough, and more fragile insulating materials, and insulating materials that are incapable of sustaining themselves, such as silica gel, exfoliated vermiculite, magnesia fill, and even rock wool, may be used. In the construction shown in Figure 4 the lining 70 is preferably of metal or may be a refractory coating, and the shells 70 and 20' are attached to the nose section 23 by any suitable fastening. The shell 70 is suitably recessed at 71 so as to receive the forward mounting shroud 38, but the rear mounting shroud may, in this instance, be narrowed as indicated at 73 since the rear portion 74 of the inner shell 70 serves to provide the necessary protection of the insulating filling at the rear end of the unit. The operation of the unit shown in Figure 4 is the same as that shown in Figures 1–3.

Figure 5:
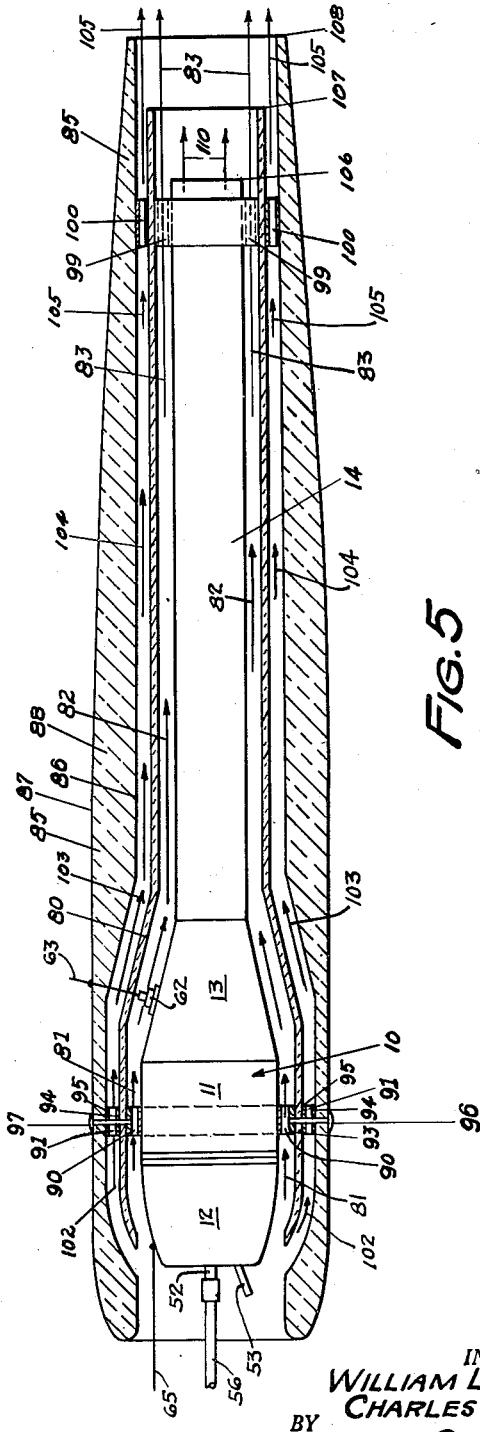

In Figure 5 there is illustrated another form of the invention in which the jet propulsion device 10 is of the same general construction as previously described. In this unit, however, there is provided an intervening shell 80 which generally conforms to the outer surface configuration of the jet propulsion unit but is spaced therefrom so as to provide an air space as indicated by the arrows 81, 82 and 83 through which cooling air may pass. If desired, the shell 80 may be of metal or may be of insulating or refractory material, a metal shell that is polished so as to reduce radiation, or a metal shell that is insulated, which serves not only to define the cooling air path along arrows 81, 82 and 83, but also to prevent some or most of the heat from passing outside of the shell 80. In addition, the outer mounting shell, as generally indicated at 85 may likewise be of metal or may be composed of an inner shell 86 and an outer shell 87 providing an interior space 88 that is filled with heat insulation. The mounting of the unit 10 is by means of a plurality of longitudinal fins at 90 and 91. The fins 90—90 may, if desired, be attached to a mounting ring 93 and in the event the shroud 80 is not of sufficiently strong material to stand the mounting forces, inner rings may be provided at 94 and 95 so as to receive and serve as a mounting for the longitudinal fins 91. A mounting screw having a relatively large flat head is provided at 96 and another at 97. The screws pass through the outer shell 85 and the intervening shell 80 and are threaded into the mounting ring 93, thereby serving to maintain the jet propulsion unit 10 centrally located and the shell 80 in fixed spaced relationship with respect to the unit 10 and the interior surface of the shell 85. A plurality of similar mounting fins and rings, if desired, may be provided at the rear end of the unit, as indicated at 99 and 100. The space between the intervening shell 80 and the interior surface 86 of the outer unit 85 provides for the passage of air as indicated by the arrows 102, 103, 104 and 105. The rear ring 99 mounted on the exhaust tube 14 is not permanently secured to the intervening shell 80 nor is the ring 100 so secured to the outer shell 85 as will be seen from Figure 5. Here, as in the form of the invention shown in Figure 1, longitudinal movement of the exhaust tube 14 with respect to the intervening shell 80 is permitted; and, similarly, longitudinal movement between the intervening shell 80 and the outer shell 85 may occur.

It will be noted that the rear end 106 of the jet propulsion device terminates a short distance within the rear end 107 of the intervening shell 80, and the rear end 107 of the intervening shell likewise terminates a short distance within the rear terminal edge 108 of the outer shroud 85. Accordingly, as exhaust gases issue from the jet propulsion device, as indicated by the arrow 110, they produce a jet effect and enhance the movement of cooling air, as indicated by the arrows 83, and the combined movement of the exhaust and cooling air gases, as indicated by the arrows 110 and 83 causes a further jet effect which facilitates the movement of air along the path defined by arrows 102—105. Heat dissipated by the jet propulsion device from the combustion zone and adjacent portions of the exhaust pipe 14 causes considerable heat of the air, particularly that portion of the cooling air which passes along the path of arrows 81—83. Accordingly these gases, and to some extent those shown at 105, are expanded and issue forth with a blast effect which increases the overall jet force of the unit as compared with the force produced by the jet propulsion device 10 when mounted in open air.

In the devices shown in Figures 1–5 the outer shell, for example shell 20 of Figure 1 or 20' of Figure 4, and the intervening shell 80 and outer shell 85 of Figure 5, are constructed so as to be longitudinally divided into two or more longitudinal sections. In the preferred form the outer shroud or shells are made in two halves, split lengthwise along the unit and are held in place by any suitable fastening, such as clips, bands, or by portions of the vehicle or propelled unit, of which the shell may constitute a part. If desired, however, the shell may be made so that the jet unit 10 may be inserted from the front end. Thus, in the device shown in Figure 6 the outer shell generally designated 120 is preferably made from a solid piece of refractory or heat insulating material, such as asbestos, composition, foamaceous cellular glass, or the like, or several pieces that are permanently fastened together to form the shell. Thus, the shell 120 may be turned or bored from a solid block of foamaceous cellular glass (Foam Glass), magnesia, molded asbestos or the like, so as to have an outwardly tapered forward end 121 and a lesser tapered rearward end 122. The interior of the shell has a portion of uniform diameter from the front end to the line 123 and then tapers along a straight line to a minimum diameter at the rear edge 124. The jet propulsion device 10 is, in this instance, provided with a mounting ring 125 supported by two or more longitudinal spacers 126. The ring is of a diameter such that it fits neatly into the interior bore of the outer unit 120 and is fastened in place by two or more screws 128 which pass through the unit 120 and are threaded into the ring 125. The rear mounting ring 130 is tapered to fit the tapered rear interior surface 131 of the unit 120. Ring 130 is likewise supported by a plurality of longitudinal spacing and supporting fins 133 and 134. In fitting the units together, unit 10 is pushed rearwardly into the shroud 120 until the tapered ring 130 fits neatly into the rear end of the unit 120 and screws 128 are then set in place so as to maintain the assembly. The rear overhanging portion 136 of the ring 130 serves to protect the interior surface of the outer shell 120; it being noted that the rear edge 137 of the jet propulsion unit terminates slightly within the rear terminal edge 124 of the outer shell 120. If desired, the shell 120 may be coated inside and out with a smooth surfacing material, such as a refractory filler. Water glass produces a smooth finish and is fairly refractory and can therefore be used on the inside of shell 120. Any desired finish may be used on the outside of shell 120 as it does not get hot.

The following specific example illustrates but is not intended to limit the present invention. This example shows the amount of additional propelling force which may be achieved by utilizing the teachings of the present invention:

The jet propulsion unit is of the type set forth in our copending application Ser. No. 649,882, aforementioned, except that the valve plate of the inlet tube 12 of the unit disclosed herein had eight holes .344 inch in diameter whereas that in the unit disclosed in the copending application had 16 holes .25 inch in diameter. The combustion chamber 11 had a diameter of 2.5 inches and a length of 1.75 inches and the tapered section 13 had a length of 2.5 inches. The tail pipe 14 had a diameter of 1.375 inches and a length of 15 inches. The overhanging length of the supporting ring 130 from the end 137 of the combustion chamber to the rear edge 124 was 1 inch. The interior diameter of member 120 (Figure 6) was 3 inches to line 123 and then tapered to a minimum diameter of 1.75 inches. Thus constructed, the unit provided a jet propulsion force of 2.9 pounds. When the jet propulsion device 10 was removed from the shroud 120 and tested in open air, all other conditions being the same, the jet propulsion force was 2.5 pounds, thus indicating a gain of .4 pound or approximately 17% additional jet propulsion force due to the use of the shroud 120.

As many apparently widely different embodiments of this invention may be made without departing from the spirit and scope thereof, it is to be understood that we do not limit ourselves to the specific embodiments herein except as defined by the appended claims.

What we claim is:

1. A jet propulsion device comprising a jet unit having a generally cylindrical combustion chamber, an air inlet in the front end of said chamber and a generally tubular exhaust tube extending in a direction opposite from the inlet end thereof, a plurality of spacing members mounted on said combustion chamber and extending outwardly therefrom, a plurality of spacing members supporting said exhaust tube adjacent the exhaust end thereof and extending outwardly therefrom, a generally tubular shell means surrounding said jet unit and being spaced therefrom by said spacing members with said spacing members adjacent the exhaust end of said tube being disposed within said shell and forming a slidable connection between said shell and said end of said tube, said shell means being open adjacent the inlet of said jet unit and open adjacent and extended beyond the exhaust tube and means for anchoring said shell means to said combustion chamber, said exhaust tube and said shell means being free to move longitudinally with respect to each other adjacent the exhaust end of said jet unit.

2. The apparatus of claim 1 further characterized in that said generally tubular shell means comprises an outer structural framework sheeting and a self-sustaining insulation therein, the inner surface of said insulation constituting the inner surface of said shell means.

3. The apparatus of claim 1 further characterized in that said generally tubular shell means comprises an outer structural framework sheeting, an inner structural framework sheet liner spaced therefrom and a fragile insulating material supported by said outer and inner frameworks and filling the space therebetween.

4. A jet propulsion device comprising a jet unit having a generally cylindrical combustion chamber, an air inlet in the front end of said chamber and a generally tubular exhaust tube extending in a direction opposite from the inlet end thereof, a plurality of outwardly extending spacing members mounted on said combustion chamber, a plurality of outwardly extending spacing members supporting said exhaust tube adjacent the exhaust end thereon, a generally tubular shell means surrounding said jet unit and being spaced therefrom with said spacing members adjacent the exhaust end of said tube being disposed within said shell and forming a slidable connection between said shell and said end of said tube, said shell means being open adjacent the inlet of said jet unit and open adjacent and extended beyond the exhaust tube, means mounted on said combustion chamber spacing members for supporting said shell means, means mounted on said exhaust tube spacing members for supporting said shell means, and means for anchoring said first named shell supporting means to said shell to prevent longitudinal displacement between said shell means and said combustion chamber, said exhaust tube and said shell means being free to move longitudinally with respect to each other adjacent the exhaust end of said jet unit.

5. A jet propulsion device comprising a jet unit having a generally cylindrical combustion chamber, an air inlet in the front end of said chamber and a generally tubular exhaust tube extending in a direction opposite from the inlet end thereof, a plurality of outwardly extending spacing members mounted on said combustion chamber, a plurality of outwardly extending spacing members supporting said exhaust tube adjacent the exhaust end thereof, a generally tubular shell means surrounding said jet unit and being spaced therefrom by said spacing members with said spacing members adjacent the exhaust end of said tube being disposed within said shell and forming a slidable connection between said shell and said end of said tube, said shell means being open adjacent the inlet of said jet unit and open adjacent and extended beyond the end of said exhaust tube, means mounted on said combustion chamber spacing members for supporting said shell means and means mounted on said exhaust tube spacing members for supporting said shell means, a plurality of outwardly extending spacing members mounted on the outer face of said shell means and being positioned over said combustion chamber spacing members, a plurality of outwardly extending spacing members mounted on the outer face of said shell means near the end thereof adjacent the exhaust end of said unit, an outer generally tubular shell means surrounding said first named shell means and being spaced therefrom by said spacing members mounted on the outer face of said first named shell means, and means for anchoring said first named and outer shells to said combustion chamber, said exhaust tube and said first named shell means being free to move longitudinally with respect to each other adjacent the exhaust end of said unit and each being free to move longitudinally with respect to said outer shell means.

WILLIAM L. TENNEY.
CHARLES B. MARKS.

REFERENCES CITED

The following references are of record in the file of this patent:

UNITED STATES PATENTS

| Number | Name | Date |
|---|---|---|
| 1,382,535 | Offen | June 21, 1921 |
| 1,611,353 | Lepinte | Dec. 21, 1926 |
| 2,074,098 | Adams | Mar. 16, 1937 |
| 2,237,329 | Bischof | Apr. 8, 1941 |
| 2,404,954 | Godsey | July 30, 1946 |